US009546114B2

(12) United States Patent
Pick et al.

(10) Patent No.: US 9,546,114 B2
(45) Date of Patent: Jan. 17, 2017

(54) SIALON BONDED SILICON CARBIDE MATERIAL

(71) Applicant: XERACARB LIMITED, South Yorkshire (GB)

(72) Inventors: Anthony Norris Pick, Barnsley (GB); Hywel Jones, Barnsley (GB)

(73) Assignee: Xeracarb Limited (GB)

( * ) Notice: Subject to any disclaimer, the term of this patent is extended or adjusted under 35 U.S.C. 154(b) by 0 days.

(21) Appl. No.: 14/653,970

(22) PCT Filed: Dec. 20, 2013

(86) PCT No.: PCT/GB2013/053379
§ 371 (c)(1),
(2) Date: Jun. 19, 2015

(87) PCT Pub. No.: WO2014/096846
PCT Pub. Date: Jun. 26, 2014

(65) Prior Publication Data
US 2015/0315088 A1 Nov. 5, 2015

(30) Foreign Application Priority Data

Dec. 20, 2012 (GB) .................................. 1222995.1

(51) Int. Cl.
C04B 35/565 (2006.01)
C04B 35/577 (2006.01)
C04B 35/626 (2006.01)

(52) U.S. Cl.
CPC ......... *C04B 35/565* (2013.01); *C04B 35/6261* (2013.01); *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3272* (2013.01);
(Continued)

(58) Field of Classification Search
CPC ............................ C04B 35/565; C04B 35/597
See application file for complete search history.

(56) References Cited

U.S. PATENT DOCUMENTS 4,801,564 A 1/1989 Baba
4,826,791 A * 5/1989 Mehrotra .............. C04B 35/597
501/88
5,521,129 A * 5/1996 Campos-Loriz ...... C04B 35/565
264/647

FOREIGN PATENT DOCUMENTS

CN 101891486 11/2010
GB 2457688 * 8/2009
(Continued)

OTHER PUBLICATIONS

Search and Examination Report dated Dec. 22, 2014 for GB1222995.1.

*Primary Examiner* — Karl Group
(74) *Attorney, Agent, or Firm* — Stoel Rives LLP

(57) ABSTRACT

A silicon carbide based material exhibiting high strength, good thermal shock resistance, high resistance to abrasion and being chemically stable to harsh environmental conditions is described. The carbide Ball Hill ceramic comprises a β-SiAlON bonding phase in which sintering is facilitated by at least one rare earth oxide sintering agents incorporated within the Vibrating Sieve batch admixture as starting materials. The residual rare earth sintering aid being chosen so as to impart good mechanical and refractory properties.

33 Claims, 9 Drawing Sheets

(52) U.S. Cl.
CPC  *C04B 2235/383* (2013.01); *C04B 2235/3869* (2013.01); *C04B 2235/3878* (2013.01); *C04B 2235/428* (2013.01); *C04B 2235/5427* (2013.01); *C04B 2235/5436* (2013.01); *C04B 2235/5445* (2013.01); *C04B 2235/5463* (2013.01); *C04B 2235/6027* (2013.01); *C04B 2235/6562* (2013.01); *C04B 2235/6586* (2013.01); *C04B 2235/663* (2013.01); *C04B 2235/764* (2013.01); *C04B 2235/767* (2013.01); *C04B 2235/77* (2013.01); *C04B 2235/783* (2013.01); *C04B 2235/786* (2013.01); *C04B 2235/80* (2013.01); *C04B 2235/85* (2013.01); *C04B 2235/96* (2013.01)

(56) References Cited

FOREIGN PATENT DOCUMENTS

| | | |
|---|---|---|
| JP | 1119566 | 5/1989 |
| JP | 1172276 | 7/1989 |
| WO | 2008100654 | 8/2008 |

\* cited by examiner

SIALON BONDED SILICON CARBIDE MATERIAL

CROSS-REFERENCE TO RELATED APPLICATIONS

This application is a national stage application under 35 U.S.C. §371 of International Application No. PCT/GB2013/053379, titled SALON BONDED SILICON CARBIDE MATERIAL, filed Dec. 20, 2013, which dams priority to Great Britain Application No. 1222995.1, filed Dec. 20, 2012, all of which are hereby incorporated by reference in their entireties.

FIELD OF INVENTION

The present invention relates to a silicon carbide refractory material and in particular, although not exclusively, to a ceramic material comprising an α-silicon carbide phase, a β-SiAlON phase and an intergranular phase.

BACKGROUND ART

Silicon carbide is an attractive material for many applications due to its high strength, excellent thermal stability and resistance to oxidising and chemically corrosive environments.

Example uses of silicon carbide used as a refractory include tiles, bricks and blocks, kiln furniture, linings for high temperature furnaces and crucibles for molten metal. An example of a reaction bonded silicon carbide refractory is disclosed in U.S. Pat. No. 4,990,469. Silicon carbide particles, silicon and an inorganic oxide are processed by heat treatment under nitrogen to provide materials with a density of approximately 2.7 g/cm$^3$ and with bending strengths from 30 MPa to 170 MPa. These early silicon nitride-bonded silicon carbide materials typically contain free silica ($SiO_2$) in the refractory product which is detrimental to the high temperature strength of the silicon carbide. Accordingly, developments of the initial reaction-bonded silicon carbide have used a SiAlON bond phase and in particular β-SiAlON. SiAlONs are compounds based on the silicon nitride ($Si_3N_4$) where Si and N atoms are replaced in the lattice with Al and O atoms. Examples SiAlON-bonded silicon carbide materials are described in U.S. Pat. No. 5,521,129 and US 2006/0281625.

There is an increasing requirement for energy saving in the ceramics manufacturing industry, not only to reduce production costs but also to satisfy environmentally friendly criteria. Manufacturers of ceramic products, ranging from porcelain through technical ceramics to building materials, are now using methods to improve efficiency by automatically loading and unloading kiln cars and using faster firing cycles. The kiln furniture used for these applications must be low mass and thermally stable, have a high strength, have excellent thermal shock and oxidation resistance, the ability to withstand high temperatures and retain strength at operating temperatures.

In addition, there is an increasing use of high strength, wear resistant ceramic products in a number of more exotic applications; including aircraft engines, brake discs for high performance cars, cyclones and hydro cyclones as well as for personal body armour. All of these applications require ceramic products having high strength, high hardness, excellent impact resistance, excellent abrasion resistance (for certain applications) and the ability to withstand sudden temperatures changes.

Typically, the established silicon nitride-bonded silicon carbides for refractory applications are shape processed by hydraulic, hammer or vibration pressing, or extrusion. The resulting shapes are fired in a nitrogen atmosphere to convert silicon metal powder to α-silicon nitride ($Si_3N_4$) and β-silicon nitride (the bonding system) in situ. The silicon metal powder used for this type of product frequently contains 96-98% silicon and iron present, as an impurity. The iron is known to act as a catalyst during the metal-nitrogen (gas/solid) reaction. It is well known that all silicon carbide refractory shapes are susceptible to oxidation above about 1400° C., which eventually leads to product failure. This includes silicon nitride-bonded silicon carbide refractories.

For certain shapes made by slip casting or vibration casting, clay is added to the composition to aid the casting process, which contains silica, alumina and a number of other oxides. During the firing process in a nitrogen atmosphere, these combine with the silicon metal to form a bond containing predominantly silicon oxynitride as well as some α-silicon nitride, β-silicon nitride and glassy phases. Silicon oxynitride and the glassy phases significantly improve the cold abrasion resistance but are detrimental to the thermal properties, particularly resistance to thermal shock and oxidation.

Accordingly, there is a need for a SiAlON bonded silicon carbide material that has improved oxidation resistance, higher strength at ambient and high temperature and which has excellent thermal shock and abrasion properties.

SUMMARY OF THE INVENTION

Accordingly, it is an objective of the present invention to provide a silicon carbide based material exhibiting low porosity, high strength (both at ambient temperature and at elevated temperatures), good thermal shock resistance, high resistance to abrasion and oxidation and is chemically stable to acidic and alkali environments. The desired physical, mechanical and chemical properties of the present materials are provided inter alia by the incorporation within the admix of at least one sintering aid, including in particular a compound selected from rare earth metals and specifically their oxides. The advantageous physical properties may also be achieved by processing the material formulation to create a crystalline rare earth species (optionally a garnet) as an intergranular phase within the final material structure.

The present SiAlON bonded system produces a product that is stronger than silicon nitride, has better resistance to oxidation, is chemically stable and is resistant to most acids and alkalis. Additionally the present material is less costly and more energy efficient to manufacture than the equivalent silicon nitride-bonded silicon carbide as the material can be fired in a conventionally heated kiln with a nitrogen atmosphere and does not require vacuum induction furnaces. The present method is advantageous to produce a product exhibiting increased strength at ambient and elevated temperature, improved oxidation resistance, increased density and good thermal shock resistance while retaining the ability to be easily shaped and sintered at modest temperatures (e.g., <1800° C.) due to the incorporation of a sintering aid which enhances densification and bonding at lower temperatures.

The present material is suitable for a variety of applications including:

i) low mass kiln furniture for the rapid firing of porcelain, the sintering of technical ceramics or the heat treatment of super-alloys. In particular the material can be used where strength and reliability are required such as in the case of heavy parts and robotically operated production lines. In these applications the material can be used to make beams, large plates, setters, batts and any other shape used to support the ceramic piece which is being fired;

ii) wear resistant applications where abrasive and erosive wear is dominant with abrasive particles present in either liquid of gas mediums. In particular where these conditions exist at elevated temperature and both oxidation resistance and high temperature strength are required. e.g., hydrocyclone parts, power station pipe liners, gas burner nozzles, non-ferrous metal pump parts, slurry handling pump parts, centrifugal decanters and wear surfaces for shot blast cabinets;

iii) body armour and ballistic protection: where a material with a lower density than sintered SiC or $Al_2O_3$ is required in order to lower the weight of the armour system or where conformal parts with complex curves are required in the design or shapes that cannot be achieved using hot pressing methods;

vi) engineering applications where the combination of the material properties make the materials suitable for a specific application.

According to a first aspect of the present invention there is provided a ceramic material comprising: an α-silicon carbide phase of 60 to 80% by weight having at least two mean grain sizes of i) 70 to 250 μm and ii) 0.5 to 50 μm; a β-SiAlON phase of 20 to 40% by weight; and an intergranular phase at least partially surrounding the α-silicon carbide and β-SiAlON phases of trace to 10% by weight comprising at least one rare earth element.

Optionally, the mean grain sizes comprise i) 110 to 200 μm and ii) 1 to 25 μm and more preferably, i) 115 to 155 μm and ii) 1 to 15 μm. More preferably, the mean grain sizes comprise i) 120 to 150 μm and ii) 3 to 10 μm. The present grain size distribution of the α-silicon carbide is advantageous to promote the formation of a strong green (powdered body) and a resulting ceramic with enhanced strength, hardness and toughness via a high green density which assists with subsequent sintering.

In one aspect, the material may further comprise an α-silicon nitride phase of trace to 40% by weight. In one aspect, the α-silicon nitride and β-sialon phases may be present in combination at an amount 20 to 40% by weight optionally the α-silicon nitride phase is present at 28 to 32%.

Optionally, the intergranular phase further comprises the elemental constituents: aluminium, oxygen, nitrogen and/or silicon. Optionally, at least some of the further elemental constituents may be present as $RE_3Al_5O_{12}$ or $RESi_3O_3N_4$ or as an amorphous mix thereof, where RE comprise any one of the set of: Sc; Y; La; Ce; Pr; Nd; Pm; Sm; Eu; Gd; Tb; Dy; Ho; Er; Tm; Yb; Lu.

Optionally, the intergranular phase further comprises iron of trace to 10% by weight. Optionally, the material further comprises a silicon metal phase. In one aspect, the silicon metal comprises discrete Si particles or grains within the α-silicon carbide and/or α-silicon nitride matrix.

Optionally, an aspect ratio of α-silicon carbide within the α-silicon carbide phase to silicon within the β-SiAlON and/or α-silicon nitride phase is in a range 1:1:1 to 1:1:3. Preferably, the aspect ratio is 1:1:1. In particular, the 3D morphology of the grains may be cuboid, spherical or slightly elongate including for example rectangular cuboidal or ovoid. In particular, the grains are substantially equiaxed and not formed as whiskers.

Optionally, the rare earth element comprises gadolinium and/or lanthanum. Optionally, the material further comprises ytterbium and/or yttrium.

Optionally, the intergranular phase comprises at least one, two or at least two of the following set of: Sc; Y; La; Ce; Pr; Nd; Pm; Sm; Eu; Gd; Tb; Dy; Ho; Er; Tm; Yb; Lu. More preferably, the intergranular phase comprises La and/or Gd. Preferably, the intergranular phase comprises two or at least two rare earth elements.

Optionally, the intergranular phase is formed as a crystalline phase. Optionally, the crystalline phase is a garnet phase. In one aspect, the intergranular phase is formed as a glass phase. The characteristics of the intergranular phase of the resulting ceramic may be determined by a rate of cooling the heat treated body or by an isothermal hold stage in the cooling cycle.

In one aspect, the garnet phase is represented by the formula: $(RE'/RE'')_3Al_5O_{12}$ where RE' and RE'' comprise any one of the set of Sc; Y; La; Ce; Pr; Nd; Pm; Sm; Eu; Gd; Tb; Dy; Ho; Er; Tm; Yb; Lu.

Optionally, the β-sialon phase is represented by $Si_{6-z}Al_zO_zN_{8-z}$ wherein z is in the range 0.25 to 4, 0.25 to 1.5, or 0.6 to 2.0. The combination of β-SiAlON and α-silicon nitride phases provides the desired physical and mechanical properties of the ceramic where the α-silicon nitride promotes hardness whilst the β-SiAlON phase enhances toughness, oxidation and chemical resistance. The combination of these two phases therefore is advantageous to enhance the bond phase hardness of the resulting ceramic. Advantageously, the present intergranular phase is effective to surround the α-silicon carbide, the β-SiAlON and α-silicon nitride grains and acts to bind the phases together, resulting in a strong material.

Optionally, a surface oxide layer is present at the surface of the material containing oxides formed from the intergranular phase and oxides formed from the silicon carbide and/or silicon nitride phases. Optionally, the surface oxide layer comprises predominantly a rare earth disilicate and the silicon oxide phase comprises silicon oxide cristobalite or the phases silicon oxynitride and/or O-SiAlON.

According to a second aspect of the present invention there is provided a process for producing a ceramic material comprising: preparing a powdered batch of an admixture comprising: α-silicon carbide at 60 to 80% by weight having at least two mean grain sizes of i) 70 to 250 μm and ii) 0.5 to 50 μm; powdered silicon metal at 15 to 20% by weight; α-alumina at 2 to 6% by weight; and at least one rare earth oxide at trace to 10% by weight; processing the powdered batch to create a body; heat treating the body under a nitrogenous atmosphere to form: an α-silicon carbide phase; a β-SiAlON phase and an intergranular phase containing at least one rare earth element of the rare earth oxide as part of the ceramic material.

Optionally, the α-silicon carbide is present at: 70 to 250 μm mean grain sizes at 30 to 40% by weight; 0.5 to 50 μm mean grain sizes at 30 to 40% by weight.

Optionally, the rare earth oxide comprises an oxide of gadolinium and/or lanthanum. Optionally, the rare earth oxide comprises an oxide of ytterbium and/or yttrium.

Optionally, the rare earth oxide is a mixed oxide and comprises any one of the set of: $Y_2O_3$ and $Yb_2O_3$; $Y_2O_3$ and $Gd_2O_3$; $Y_2O_3$ and $La_2O_3$; $CeO_2$ and $La_2O_3$; $La_2O_3$ and $Gd_2O_3$.

Optionally, the step of heat treating the body comprises heat treating at a temperature in the range 1300 to 1750° C. Optionally, the process further comprises heat treating the body at a first processing temperature in the range 1400 to 1500° C. Optionally, the process further comprises heat treating the body at a second processing temperature in the range 1550 to 1750° C.

Optionally, the step of heat treating the body at the first processing temperature comprises heat treating in a flowing nitrogenous atmosphere; and the step of heat treating the body at the second processing temperature comprises heat treating in a substantially static nitrogenous atmosphere. Optionally, the process further comprises heat treating the body at the second processing temperature for three to five hours. Optionally, the process further comprises heat treating the body at a third processing temperature in the range 1100° C. to 1400° C. Optionally, the step of heat treating the body at the third processing temperature is configured to promote creation of a surface oxide layer comprising a rare earth disilicide, a cristobalite, a silicon oxynitride and/or O-SiAlON.

According to a third aspect of the present invention there is provided a ceramic material comprising: an α-silicon carbide phase of 60 to 80% by weight having at least two mean grain sizes of i) 70 to 250 μm and ii) 0.5 to 50 μm; a β-SiAlON phase of 20 to 40% by weight; and an intergranular phase at least partially surrounding the α-silicon carbide and β-SiAlON phases of trace to 10% by weight comprising at least one or a combination of gadolinium and lanthanum.

Optionally, the intergranular phase comprising gadolinium and lanthanum further comprises any one or a combination of the elemental constituents: aluminium, oxygen, nitrogen and/or silicon.

Optionally, the intergranular phase further comprises anyone or a combination of the following set of: Sc; Y; Ce; Pr; Nd; Pm; Sm; Eu; Tb; Dy; Ho; Er; Tm; Yb; Lu.

According to a fourth aspect of the present invention there is a process for producing a ceramic material comprising: preparing a powdered batch of an admixture comprising: α-silicon carbide at 60 to 80% by weight having at least two mean grain sizes of i) 70 to 250 μm and ii) 0.5 to 50 μm; powdered silicon metal at 15 to 20% by weight; α-alumina at 2 to 6% by weight; and at least one or a combination of gadolinium and lanthanum oxides at trace to 10% by weight; processing the powdered batch to create a body; heat treating the body under a nitrogenous atmosphere to form: an α-silicon carbide phase; a β-SiAlON phase and an intergranular phase containing gadolinium and lanthanum as part of the ceramic material.

Optionally, the gadolinium and/or lanthanum oxides are included at trace to 3% by weight.

According to a further aspect of the present invention there is provided a silicon carbide refractory material formed from a heat treatment sintering process of powdered starting materials, the starting materials comprising: silicon carbide; powdered silicon metal; aluminium oxide; an iron oxide catalyst and at least two rare earth oxides; wherein β-SiAlON is formed during processing of the starting materials and which acts as a bond between particles of the silicon carbide.

Reference within this specification to a powdered silicon metal include a metallurgical grade silicon that is powdered or comprises a fine granular configuration. The term 'metal' or 'metallurgical grade' encompasses both high purity silicon (>95% and in particular >98%) and silicon containing small impurities and/or other compounds such as silicon carbide.

Where a crystalline, and in particular a garnet phase is required, the list of rare earth oxides that are suitable, their melting points as pure oxides and the solidus temperature for the garnet phase formed ($RE_3Al_5O_{12}$) where RE is the rare earth, is shown in table 1. The list of table 1 comprises rare earths having phase diagrams with $Al_2O_3$ that predict the formation of the garnet phase. Where it is known, the lower solidus temperature of the RE-Al-Si-O system is typically lower than the melting point and solidus temperature of the pure oxide and garnet, respectively. This is advantageous when attempting to sinter admixtures containing the pure oxide and/or garnet materials.

TABLE 1

Rare earth oxides

| Rare Earth Oxide (RE) | Melting Point as Oxide, ° C. | Solidus Temperature as Garnet Phase ($RE_3Al_5O_{12}$), ° C. | $RE_2O_3$—$Al_2O_3$—$SiO_2$ Solidus Temperature, ° C. |
|---|---|---|---|
| Tb | 2400 | 1860 | |
| Dy | 2370 | 1916 | |
| Eu | 2360 | 1920 | |
| Y | 2430 | 1930 | 1370-1400 |
| Gd | 2410 | 1940 | |
| Ho | 2382 | 1950 | |
| Er | 2392 | 1960 | |
| Tm | 2410 | 1980 | |
| Yb | 2403 | 2010 | 1500-1550 |
| Lu | 2510 | 2043 | |

Optionally, the starting materials may further comprise α-alumina. Optionally, the starting materials may further comprise $SiO_2$.

Optionally, the silicon carbide comprises: coarse silicon carbide of 0.5 to 150 μm particle size at 30 to 42% by weight; and fine silicon carbide of 0.5 to 10 μm particle size at 30 to 42% by weight.

Optionally, the material has a bulk density of 2.7 to 2.9 g/cm$^3$ following the heat treatment sintering process. Importantly, the present material is advantageous in that sintering is possible without applied pressure. Whilst sintering is possible via elevated pressures, using for example, hot pressing to achieve higher densities, the shapes and sizes available for the products created are limited by this conventional moulding process. The subject material and processing method is therefore beneficial by enabling the manufacture of products of largely unlimited size and shape via an energy efficient process.

According to a further aspect of the present invention there is provided a silicon carbide refractory material comprising: silicon carbide as a main component; β-SiAlON; and a rare earth aluminium garnet or other crystalline phase containing the rare earth and oxides, formed from a rare earth oxide, the crystalline phase forming at least an intergranular phase within the material.

Other crystalline phases containing the rare earths and oxygen along with nitrogen, aluminium and/or silicon are also possible and can be formed using different heat treatment processes. Optionally, the material may comprise $RE_2Si_3O_3N_4$, a phase known as N-melilite or $RE_4Si_2O_7N_2$ a phase known as J-phase.

According to a further aspect of the present invention there is provided a process for producing a refractory article comprising: preparing a powdered batch of an admixture comprising: silicon carbide; powdered silicon metal; aluminium oxide; and at least one or two rare earth oxides; processing the powdered batch to create a body; heat treating the body under a nitrogenous atmosphere to form β-SiAlON as a part of the article.

Optionally a cooling rate or isothermal heat treatment in the range 1000° C. to 1300° C. during cooling from the sintering temperature is employed such that the crystallisation of the rare earth is allowed to occur.

Optionally, the process comprises a third temperature processing stage. Optionally, the body is heat treated according to a third firing stage at between 1250° C. and 1350° C. Preferably, the third firing stage comprises heating in air.

According to a specific implementation, the third stage temperature processing promotes formation of a thin and dense surface oxide layer comprising silica ($SiO_2$) and a rare earth disilicate ($RE_2Si_2O_7$), such as yttrium disilicate ($Y_2Si_2O_7$). It has been observed that the surface oxide layer acts to seal the porosity at the surface of the product.

According to a further aspect of the present invention there is provided a ceramic material comprising: an α-silicon carbide phase of 60 to 80% by weight having at least two mean grain sizes of i) 70 to 250 μm and ii) 0.5 to 50 μm; a β-SiAlON phase of 20 to 40% by weight; an intergranular phase at least partially surrounding the α-silicon carbide and β-SiAlON phases of trace to 10% by weight comprising a combination of elemental constituents including: at least aluminium and oxygen.

According to a further aspect of the present invention there is provided a process for producing a ceramic material comprising: preparing a powdered batch of an admixture comprising: α-silicon carbide at 60 to 80% by weight having at least two mean grain sizes of i) 70 to 250 μm and ii) 0.5 to 50 μm; powdered silicon metal at 15 to 20% by weight; α-alumina at 2 to 6% by weight; processing the powdered batch to create a body; heat treating the body under a nitrogenous atmosphere to form: an α-silicon carbide phase; a β-SiAlON phase and an intergranular phase forming part of the ceramic material.

BRIEF DESCRIPTION OF THE DRAWINGS

The present invention will now be described, by way of example only, and with reference to the accompanying drawings in which.

DETAILED DESCRIPTION OF PREFERRED EMBODIMENT OF THE INVENTION

Figure 1:
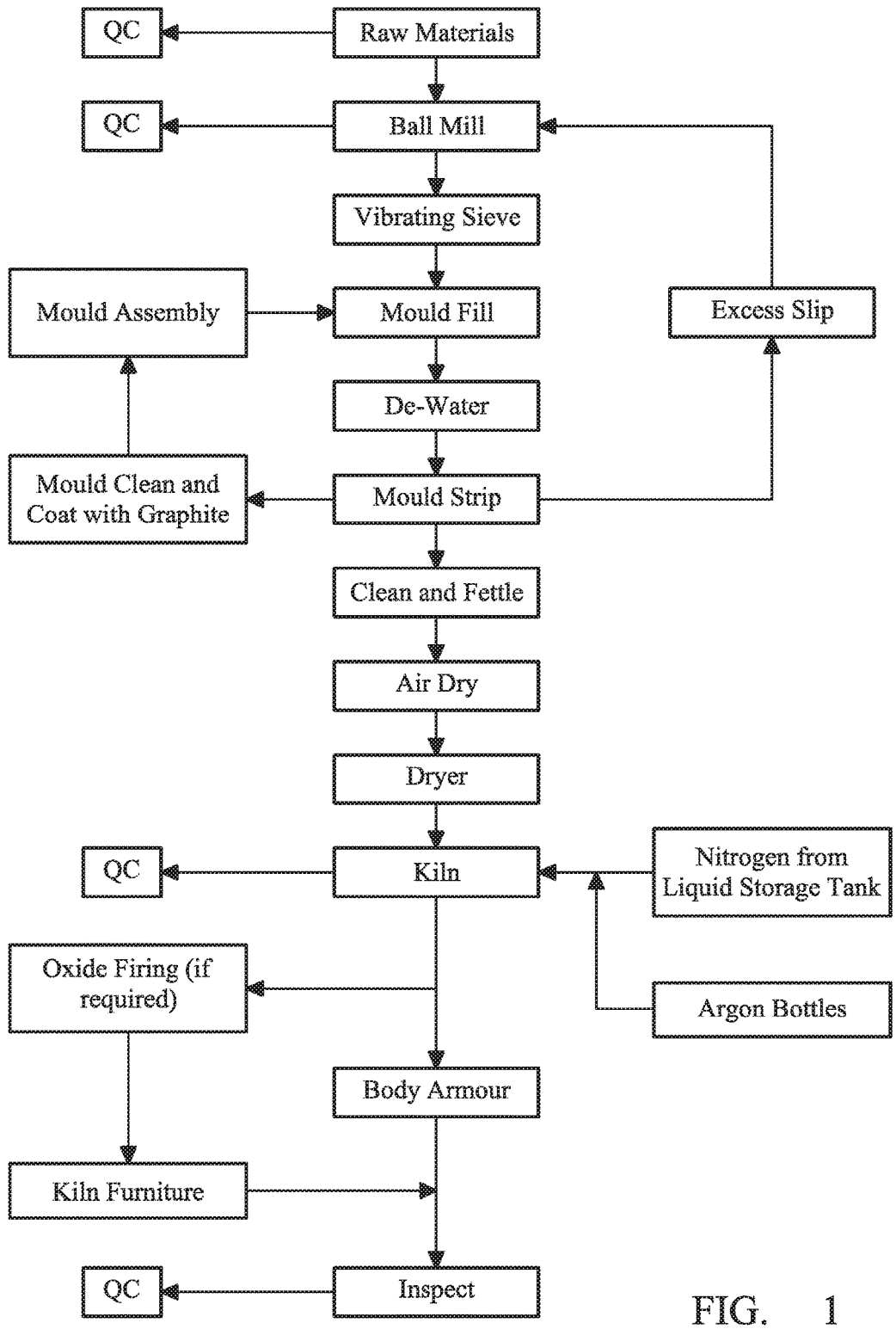
FIG. 1 is a flow diagram for a slip production process according to one embodiment of the present invention.
Figure 2:
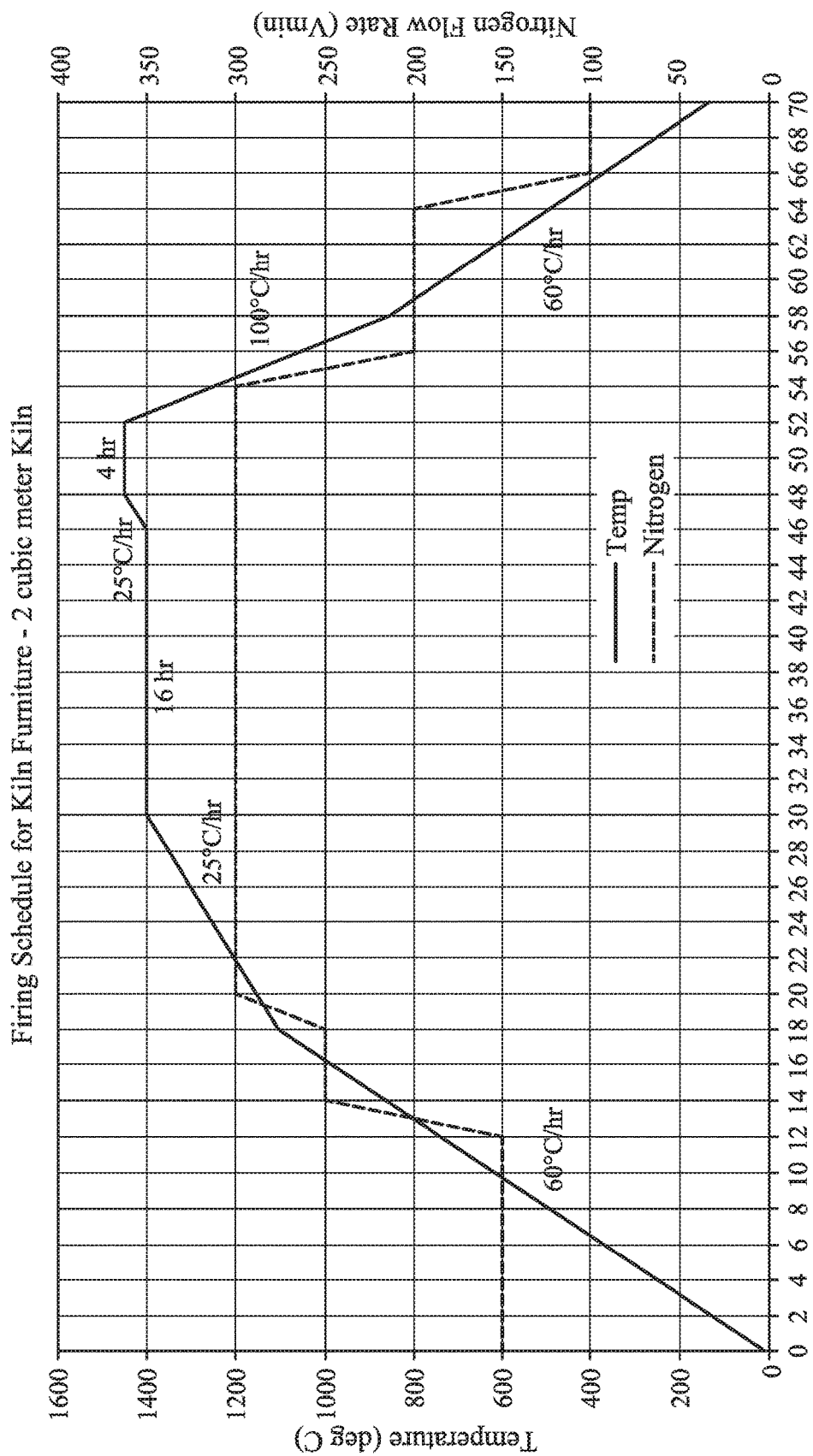
FIG. 2 is a graph of a first firing schedule for kiln furniture according to one embodiment of the present invention.
Figure 3:
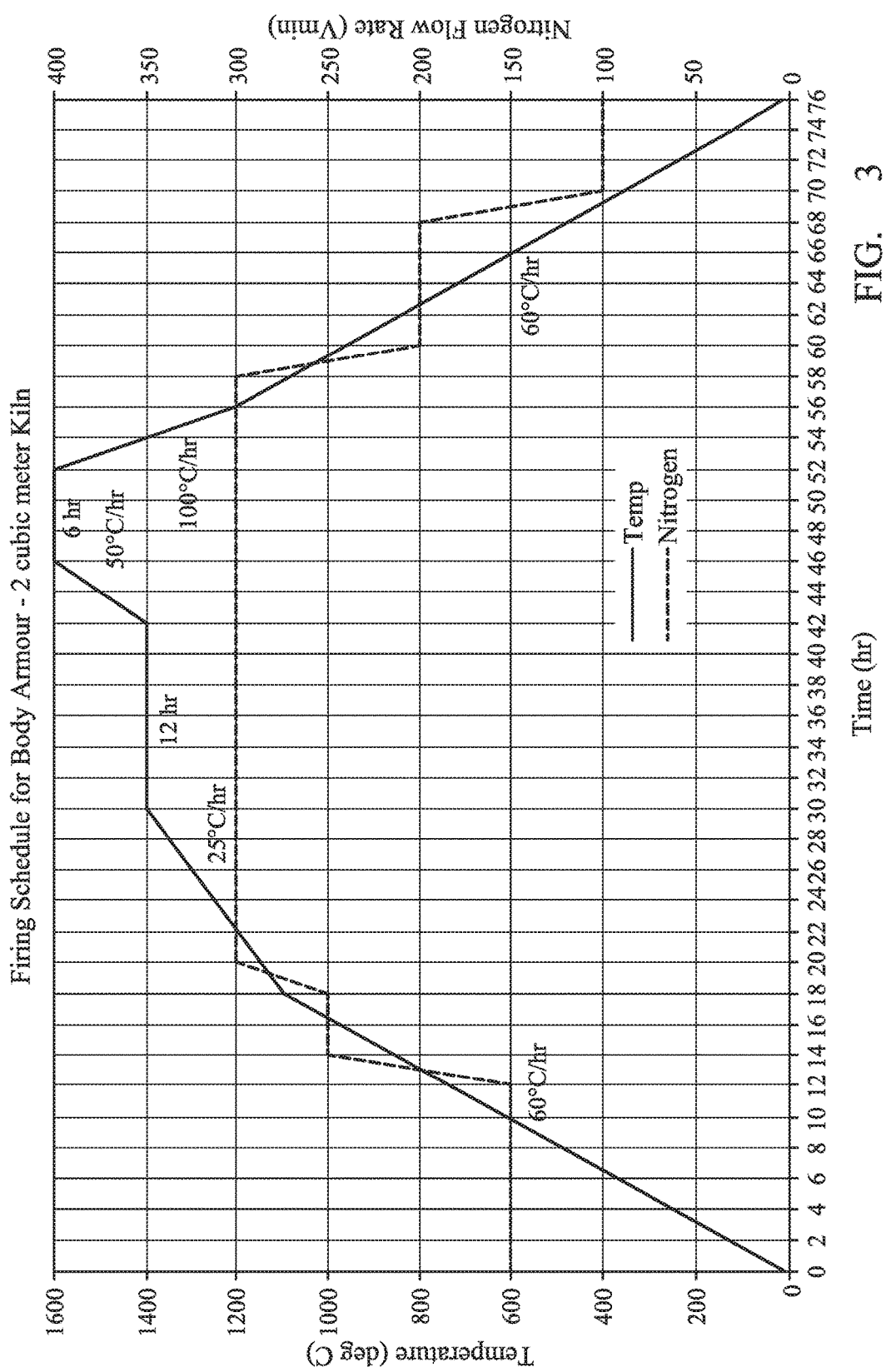
FIG. 3 is a graph of a firing schedule for body armour according to one embodiment of the present invention.
Figure 4:
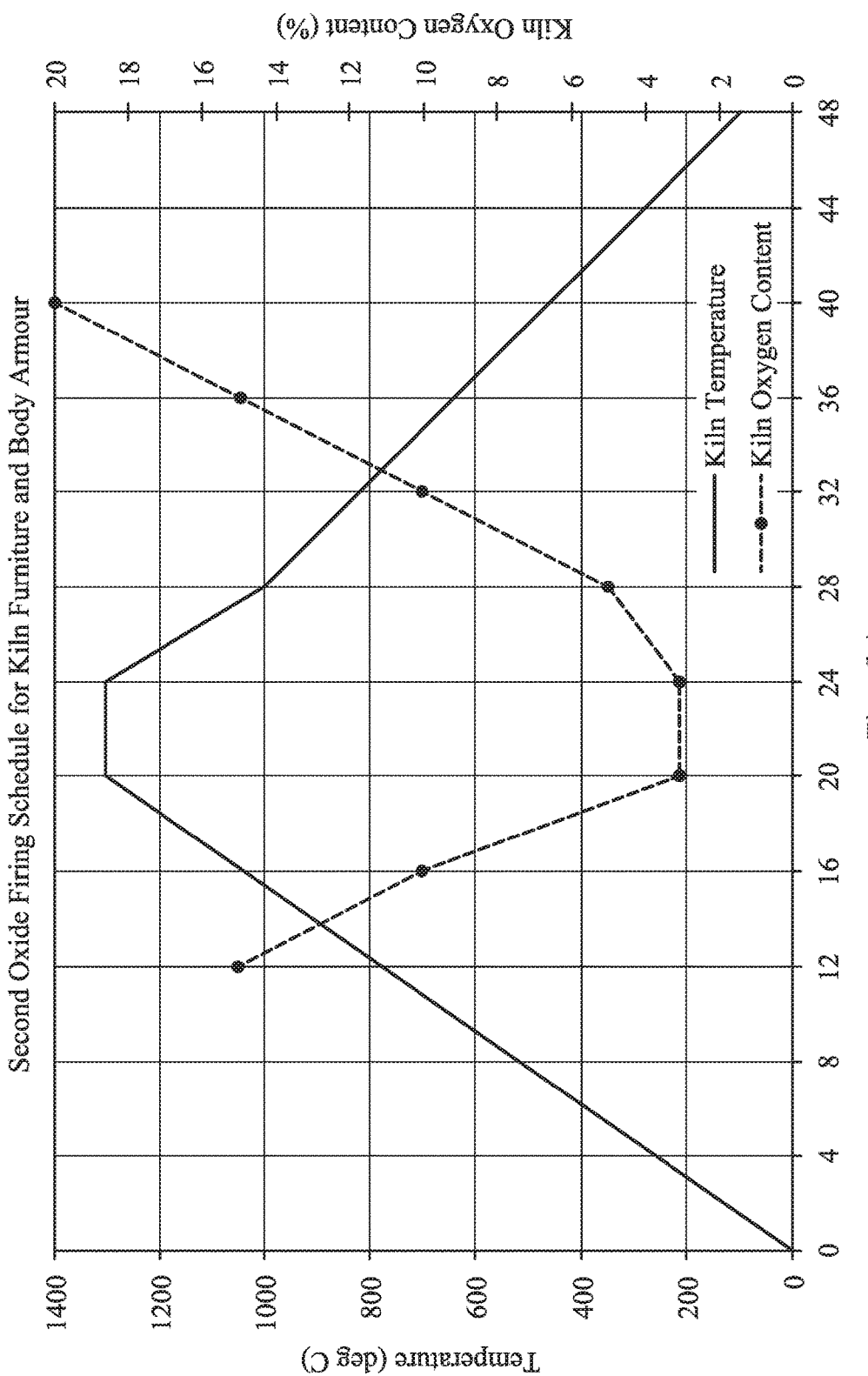
FIG. 4 is a graph of an oxide firing schedule for the kiln furniture and the body armour according to one embodiment of the present invention.

A specific embodiment of the present invention is described with reference to the following examples.

Example 1

Table 2 details typical starting materials according to the subject invention comprising two rare earth oxides as sintering aids in the manufacture of a SiAlON bonded silicon carbide refractory material.

TABLE 2

| Starting materials formulation | | |
|---|---|---|
| Raw Material | Grade | SC (%) |
| Green Silicon Carbide - Coarse | 100/F | 40.0 |
| Green Silicon Carbide - Fine | FCP | 36.0 |
| Silgrain Standard - Silicon Metal Powder | 0-53 μm | 20.0 |
| Reactive Alumina | alpha | 4.0 |
| Iron (III) Oxide - $Fe_2O_3$ | Red Calcined | +0.5 |
| Yttrium Oxide ($Y_2O_3$) | Purity >99% | +0.8 |
| Ytterbium Oxide ($Yb_2O_3$) | Purity >99% | +0.8 |
| Sodium Hydroxide | 1M | +0.4 |
| De-ionised Water | | +11.5-14.0 |

Table 3 lists the aqueous slip properties of the resulting body based on the starting materials of table 2.

TABLE 3

| Slip properties | |
|---|---|
| pH | 7.0-8.0 |
| Slip Density (g/cm³) | >2.45 |
| Viscosity (deg swing) | 180-220 |
| Thixotropy (5 min) | Nil |
| Dried Green BD | =>2.45 |

The Viscosity was measured by a Gallenkamp Viscometer with ¹¹⁄₁₆" bob and 30 swg wire. The linear Firing Shrinkage (Dry to Fired) was found to be 0.10-0.15%

Experimental

Raw Materials

Two grades of silicon carbide, were used including firstly an acid washed green silicon carbide 100/F having physical properties: Loose PD=1.42 g/cm³; and pH=7.0:

TABLE 4

| Silicon carbide sieve analysis (%) | | | | |
|---|---|---|---|---|
| +150 μm | +106 μm | +75 μm | +45 μm | -45 μm |
| <4 | 35-45 | 50-60 | 70-85 | <3 |

TABLE 5

| Silicon carbide chemical analysis (%) | | | | | |
|---|---|---|---|---|---|
| SiC | C (free) | Si (free) | $Al_2O_3$ | CaO | Magnetic Iron |
| 99.5 | <0.2 | <0.2 | <0.03 | <0.01 | <0.02 |

Possible suppliers include: ESK-SIC GmBH, Frechen, Germany with a quality: SiCgrün 100/F (SiC green 100/F); St Gobain Ceramic Materials Lillesand, Norway with a quality: 100/F HD and Navarro SIC SA, Madrid, Spain with a quality: SiC green 100/F.

A second grade silicon carbide was used being a green silicon carbide, fine ceramic powder/FCP having physical properties:

TABLE 6

Green silicon carbide physical properties

| D10 (µm) | D50 (µm) | D90 (µm) | SSA (m$^2$/g) | pH |
|---|---|---|---|---|
| <10% | 1.8-2.8% | <10% | 3.5-5.5 | 7.0 |

TABLE 7

Chemical analysis (%) of green silicon carbide

| SiC | C (free) | Si (free) | Al$_2$O$_3$ | CaO | Fe$_2$O$_3$ |
|---|---|---|---|---|---|
| >97 | <0.5 | <0.7 | <0.2 | <0.01 | <0.2 |

Possible suppliers include: ESK-SIC GmBH, Frechen, Germany with a quality: NF 2/2025; St Gobain Ceramic materials, Lillesand, Norway with a quality: FCP 07 and Pacific Rundum Co Ltd, Toyama, Japan with a quality: GNF 6S.

Acid leached silicon metal powders from Elkem A/S, Kristiansand S, Norway having Si grain standard of 0-53 µm were used with a sieve analysis (%) of +53 µm, 5 (max).

TABLE 8

Chemical analysis (%) of silicon metal powder

| Si | Fe | Al | Ca | Ti |
|---|---|---|---|---|
| 99.3 (typical) | 0.15-0.35 | 0.2-0.35 | 0.02-0.05 | 0.015-0.035 |

A reactive alumina powder from Alcan International Network UK Ltd, UK was used as follows: ball milled calcined alumina without any organic additives; super ground multimodal aluminium oxide (mainly α-phase) with a very low soda and a low water demand. The physical properties include: particle size distribution (Sedigraph) $D_{50}$ 2.46 µm (typical); BET Surface Area 2.35 m2/g (typical); fired density (1670° C./1 hr); 3.8 g/cm$^3$; water absorption 14 ml/100 g.

TABLE 9

Chemical analysis of reactive alumina powder

| Al$_2$O$_3$ | Na$_2$O | CaO | SiO$_2$ | Fe$_2$O$_3$ |
|---|---|---|---|---|
| 99.7% (typical) | 300 ppm (typical) | 205 ppm (typical) | 880 ppm (typical) | 150 ppm (typical) |

Red calcined iron (III) oxide from P J Colours Ltd, Flint, UK or Fahrenheit Laboratory Services Ltd, UK was used with the following physical properties: sieve residue (0.045 mm sieve)<0.06%; $D_{50}$ 0.22 µm; pH 4.0-8.0; moisture content <0.5%. The chemical analysis was: Fe$_2$O$_3$ 96-97%; and SiO$_2$+Al$_2$O$_3$<4.0%.

Yttrium Oxide Powder (Y$_2$O$_3$) from ABSCO Materials, Haverhill, UK; or Treibacherindustrie AG, Althofen, Austria was used at 99.99% purity with the following physical properties: particle size distribution (Microtrac) $D_{50}$ 2-10 µm; BET Surface Area 2-12 m$^2$/g; Loss on Ignition at 1000° C.<1.0%.

TABLE 10

Chemical Analysis of Yttrium Oxide Powder (Y$_2$O$_3$) (ppm)

| Fe$_2$O$_3$ | CaO | Na$_2$O | SiO$_2$ | Al$_2$O$_3$ | K$_2$O |
|---|---|---|---|---|---|
| <20 | <30 | <30 | <250 | <150 | <30 |

Ytterbium Oxide (Yb$_2$O$_3$) $D_{50}$=1.48 µm from ABSCO Materials, Haverhill, UK; or Treibacherindustrie AG, Althofen, Austria was used at 99.99% purity. Chemical Analysis: CaO=31 ppm, Co$_3$O$_4$=<2 ppm, Fe$_2$O$_3$=3 ppm, NiO=<2 ppm, Loss on Ignition=0.31%

A pH adjuster was used comprising sodium hydroxide (NaOH) 1M solution in water as supplied by Fahrenheit Laboratory Services Ltd, UK.

Two types of plaster from BPB Formula Ltd, Newark, UK were used for moulds. Firstly Ultramix a hard dense plaster for models case moulds; plaster:water ratio 3.03:1 (or 100:33); initial Vicat setting time 14 min; dry compressive strength 44.0 MPa; maximum linear expansion, 2 hours after setting 0.3%. Secondly, Keramicast was used (for casting moulds); slow casting plaster; plaster:water ratio 1.82:1 (or 100:55); knife setting time 8 min; dry compressive strength 14.0 MPa; maximum linear expansion, 2 hours after setting 0.3%. The mix composition was varied from 100% Keramicast to 50:50 Keramicast:Ultramix, depending on the mould size and water absorption rate required.

A natural graphite powder from James Durrans and Sons Ltd, Penistone, UK was used according to the identification—H300# GGR-8040-15-080. Finally, all water used was standard de-ionised water.

Equipment

The following equipment was used within the experimental set-up.
    weighing scales with an accuracy of ±1 g;
    ball mill either with a light charge of alumina grinding media (1 kg balls:5 kgdry charge);
    plaster moulds fitted with plastic feeder and header tubes and filling funnels;
    variable temperature drying chamber;
    nitrogen atmosphere kiln with upper temperatures of 1450° C. for kiln furniture and 1600° C. for body armour;
    suitable air atmosphere kiln for second oxidation firing as required;
    suitable casting benches and tables for stripping, cleaning and assembling the moulds;
    fettling tools.

The major characteristics of the present cast SiAlON bonded silicon carbides are that they are high strength, high bulk density and relatively low porosity. However, to achieve the excellent oxidation resistance, which contributes to the long service life in oxidising environment, it is advantageous that the starting materials are intimately mixed, the green density is high and the pore sizes are small. Small pore sizes will ensure that any oxidation will occur slowly and, as it occurs, the sizes of the pores are further reduced. To achieve this, two stages are including in the manufacturing process. Firstly, by ball milling controlled conditions, a slip is produced, which has a very even and a consistent particle size distribution. It is also homogeneous, since the components become very intimately mixed. Secondly, the moisture content of the plaster moulds, in the case of slip casting, has to be controlled in order to moderate the rate of water extraction from the body. If it is too rapid, then segregation of the mix composition can occur as a result of migration of the smaller powder particles to the surface.

Ball Mill Data for Milling the Slip

Rubber ball mills or ceramic lined ball mills were used, since metallic lined ball mills may contaminate the slip.

TABLE 11

Ball mill characteristics for various ball mill sizes with no media Ball Mill Charge

| Diameter (mm) | Length (mm) | Charge (kg) | Alumina Media (kg) | Water (kg) |
|---|---|---|---|---|
| 300 | 300 | 15.0 | 3.0 | 1.76 |
| 600 | 600 | 200.0 | 40.0 | 23.0 |
| 900 | 900 | 325.0 | 65.0 | 38.0 |

Water addition was based on 11.7%.

Production Procedure and Techniques

General

According to one embodiment using the moulds as described herein, the more important processing steps characteristics include: i) high solids content of the aqueous slip; ii) low viscosity of the slip which is controlled by the pH and water addition; iii) slow drying rate of the cast body i.e. the rate of water extraction by the mould; and iv) a controlled nitriding of the silicon, which is strongly exothermic, and (v) a complete reaction between the formed $Si_3N_4$, the alumina and the sintering aid to form β-SiAlON and an intergranular phase or amorphous or crystalline material.

Water Content and Viscosity

The amount of water required for a usable slip was observed to be influenced by a number of factors including in particular:

A) pH of the slip—the most suitable deflocculant was found to be sodium hydroxide and the lowest viscosity was obtained in the range pH=7.5-8.5. Additionally, Silicon metal reacts in acidic (pH<7.0) or strongly alkaline (pH>9.0) conditions with evolution of gases. It is, therefore, important to control the pH.

B) Electrical conductivity of the raw materials. Acid washed silicon metal was found to give better results than unwashed silicon.

C) Fineness of the silicon metal powder. Although the finer grade of silicon is more reactive, it requires more water to produce the required viscosity.

Production Procedure

Slip Production

A slip production process according to one embodiment is summarised in FIG. 1. Firstly, it was ensured that the ball mill and the alumina balls were dry. A small charge of alumina balls was added to help to break up any agglomerates of powder. However, the balls were not required for grinding, since the composition was determined for maximum packing density. All the components were weighed. The water and sodium hydroxide were premixed and added to the ball mill followed by the dry components. The ball mill was sealed and operated for 16-24 hours. The pH of the slip was measured, which should be in the range, pH=7.5-8.5. The viscosity of the slip was measured, which should be in the range 180°-220° swing (Gallenkamp Torsion Viscometer fitted with $^{11}/_{16}$" bob and 30 swg wire). The slip density was measured with a container of known volume and weighing scales, and should be a minimum of 2.45 g/cm$^3$. Adjustments were made by adding de-ionised water to bring them into the required range. The quantity of slip required for casting was removed and the ball mill restarted to keep the slip homogeneous.

Mould Preparation

To work efficiently, a mould should contain some moisture to set up an equilibrium so that evaporation from the outside surface draws water through the walls and extracts it from the slip. If the mould was found to be too dry, the sections of the mould were submerged in water for approximately 5 minutes. If the mould was judged to be wet, the mould was assembled and fastened with straps and place in an oven at 30-40° C. for 10-15 hours. The mould was opened and the working faces cleaned thoroughly. The working faces of the mould were dampened and coated with a fine graphite powder using a sponge. Excess graphite was wiped off and the moulds assembled. The straps, pipes and filling funnels were fitted. If casting into small moulds they were set in the vertical position. Alternatively, large moulds were set at approximately 30° to the horizontal.

Casting and Stripping

Flatware and Body Armour

The slip was poured into the mould in one steady and continuous operation. The mould and slip were left to stand for 0.5-3 hours. During this time the slip was de-watered, i.e., the moisture content of the green body reduces to approximately 7%. The mould is then stripped and the piece is carefully removed. Green bodies were dried at 30-40° C. until they reached a steady weight.

Firing

Kiln furniture and beams were fired in a nitrogen atmosphere to 1380-1450° C. with soaks at 1380° C. for 14 hours and 1450° C. for 6 hours. The nitriding temperature and time was varied with the size and efficiency of the kiln. In kilns with large loads the exothermic reaction of the silicon reacting with the nitrogen can create a runaway heat effect which can ruin the product. This is controlled by means of monitoring the kiln temperature. If a rise in temperature of the kiln above that programmed is detected then an injection of Ar gas can be admitted to the furnace to dilute the available nitrogen and slow the exothermic reaction. Once the temperature falls to the desired level then the Ar slow can be stopped and the reaction allowed to proceed. A continuous monitoring of the kiln temperature is required during the reaction phase.

Some items of kiln furniture require a second firing in air at 1250-1350° C. for 1 hour to seal the outer surface with the formation of a dense oxide and increase the oxidation resistance. Body armour items were fired to 1380° C. in a nitrogen atmosphere and held for 14 hours as for other products. A further separate high temperature firing was then carried out at 1650° C. for a further 4 hours under static nitrogen atmosphere to fully convert the SiAlON bond to the beta phase and to maximise bonding and sintering. The first firing schedule for the Kiln furniture is shown in Table 12. The second oxide firing schedule for the Kiln furniture and the body armour is shown in Table 13.

TABLE 12

Firing Schedule for Kiln Furniture - 2 cubic meter kiln

| Temperature (° C.) | Rate (° C./hr) | Soak (hr) | Segment Time (hr) | Nitrogen Flow Rate (l/min) |
|---|---|---|---|---|
| 20-740 | 60 | | 12 | 150 |
| 740-1100 | 60 | | 6 | 250 |

TABLE 12-continued

Firing Schedule for Kiln Furniture - 2 cubic meter kiln

| Temperature (° C.) | Rate (° C./hr) | Soak (hr) | Segment Time (hr) | Nitrogen Flow Rate (l/min) |
|---|---|---|---|---|
| 1100-1400 | 25 | | 12 | 300 |
| 1400 | | 16 | 16 | 300 |
| 1400-1450 | 25 | | 2 | 300 |
| 1450 | | 4 | 4 | 300 |
| 1450-850 | 100 | | 6 | 300 |
| 850-370 | 60 | | 8 | 200 |
| 370-130 | 60 | | 4 | 100 |
| Total | | | 70 | $16.1 \times 10^3$ |

TABLE 13

Oxide Firing Schedule for Kiln Furniture and Body Armour

| Temperature (° C.) | Rate (° C./hr) | Soak (hr) | Segment Time (hr) |
|---|---|---|---|
| 20-1300 | 65 | | 20 |
| 1300 | | 4 | 4 |
| 1300-1000 | 75 | | 4 |
| 1000-100 | 45 | | 20 |
| Total | | | 48 |

Performance Data

Abrasion Resistance

The abrasion resistance of the material measured using the method described in BS 1902-4.6:1985, where the volume loss of the sample is measured after abrasion with brown fused alumina is given below. The results are expressed as an abradability index, m, which is calibrated against standard carbon block (with m=100).

Average abradability index, m, without sintering aid=17

Average abradability index, m, with $Y_2O_3$ sintering aid=14

Improvement in abrasion resistance due to use of sintering aid=20%

Performance Characteristics

In binary rare earth oxide mixtures the eutectic temperature is rarely lowered below 2000° C. but in the presence of $SiO_2$ then the mixtures form liquids at much lower temperatures, typically 300-400° C. lower. For example, the system $Y_2O_3$—$Al_2O_3$—$SiO_2$ exhibits liquid formation at about 1370-1400° C. when 1.7 wt % $SiO_2$ is present [U. Kolitsch, H. J. Seifert, T. Ludwig and F. Aldinger (1999), Phase equilibria and crystal chemistry in the $Y_2O_3$—$Al_2O_3$—$SiO_2$ system, Journal of Materials Research, 14, pp 447-455. doi:10.1557/JMR.1999.0064]. For $Yb_2O_3$ the temperature is reported as being 100-150° C. higher [Murakami, Y. and Yamamoto, H., J. Ceram. Soc. Jpn., 1994, 102, 231-236.]. $SiO_2$ is invariably present in the materials as a surface oxide on the SiC powders and also on the Si powder. 1.7% $SiO_2$ is possible with just a few tens of nanometers of oxide on a fine powder of 5-10 microns in size.

On slow cooling, or by using isothermal heat treatment at about 1000-1300° C., the liquid phase can be crystallised forming an intergranular network of the garnet phase $RE_3Al_5O_{12}$. Alternatively under some cooling conditions other crystalline phases can form such as RE-N-Melilite and J-phase. The refractory nature of the crystalline phases gives the end product better high temperature strength compared to a material with a purely amorphous residual sintering aid phase although some reduction in oxidation resistance may be experienced.

Where the end product contains an amorphous phase (e.g. where full crystallisation has not occurred due to the use of a rapid cooling rate) then the replacement of the larger cations such as $Y^{3+}$ with smaller rare earth cations such as $Lu^{3+}$ can increase the glass transition temperature and thus also improve the refractory properties [J. E. Shelby and J. T. Kohli, "Rare-Earth Aluminosilicate Glasses," J. Am. Ceram. Soc., 73 [1] 39-42 (1990); Y. Murakami and H. Yamamoto, "Properties of Oxynitride Glasses in the Ln—Si—Al—O—N Systems (Ln Rare Earth)," J. Ceram. Soc. Jpn., 102 [3] 231-36 (1994)]. Fully replacing all the Y oxide containing sintering aid with Lu oxide sintering aid, for example, may not be desirable due to the resulting increase in the temperature at which sintering occurs and an associated decrease in the energy efficiency so a mixture of Y and Lu can provide a compromise.

By using mixtures of $RE_2O_3$ oxides the nature of the liquid phase formed on heating and the nature of the crystalline phase or amorphous phase formed on cooling can be modified such that the liquid formation temperature is low enough to allow sintering to occur at relatively low temperatures but that on cooling a refractory crystalline or amorphous phase is formed in the end product. In the garnet structure the RE cations can replace each other in many cases forming a single phase containing both cations, e.g. $(Y,Yb)_3Al_5O_{12}$ while in the amorphous phase the rare earth cations can replace Y and its coordination sites. For example, in a 1750° C. hot pressed SiC composite with ~30% $Si_3N_4$ present and $Yb_2O_3$ used as the sole sintering aid the onset of densification was 1345° C. but subsequent densification was slow with the maximum rate being achieved at 1620° C. When $Y_2O_3$ replaced half the $Yb_2O_3$ then the densification began at 1335° C. but increased more quickly and its maximum rate was achieved at 1590° C. Thus a more rapid densification was possible at a lower temperature by using mixed oxides as the sintering aid. When produced by pressureless sintering and cooled slowly the materials containing mixed Y—Yb sintering aids exhibited the formation of a crystalline garnet structure $(Y/Yb)_3Al_5O_{12}$ by XRD.

When fired (optionally via a third firing stage) to form a surface oxide, the use of rare earths promote the formation of a surface oxide layer containing the rare earth phase, for example yttrium disilicide ($Y_2Si_2O_7$) as well as a silicon oxide phase ($SiO_2$, low cristobalite). Yttrium disilicide is a more refractory phase than pure $SiO_2$ [W. Y. E. M. Levin, C. R. Robbins, and H. F. McMurdie: Phase Diagrams for Ceramists—1969 Supplement (The American ceramic Society, Inc., Columbus, Ohio, 1969), FIG. 2388, p. 76] and accordingly provides a surface layer which is more resistant to high temperatures. Advantageously it is possible to generate surface oxide layers having refractory characteristics that can be selectively adjusted or modified using mixtures of rare earths that have respectively different refractory properties (e.g. melting points).

Example 2

Table 14 details the starting materials according to a further example of the subject invention comprising Yttrium Oxide ($Y_2O_3$) as a sintering aid in the manufacture of a SiAlON bonded silicon carbide refractory material.

TABLE 14

Starting materials formulation

| Raw Material | Grade | SC (%) |
| --- | --- | --- |
| Green Silicon Carbide - Coarse | 100/F | 40.0 |
| Green Silicon Carbide - Fine | FCP | 36.0 |
| Silgrain Standard - Silicon Metal Powder | 0-53 μm | 20.0 |
| Reactive Alumina | alpha | 4.0 |
| Iron (III) Oxide - $Fe_2O_3$ | Red Calcined | +0.5 |
| Yttrium Oxide ($Y_2O_3$) | Purity >99% | +1.7 |
| Sodium Hydroxide | 1M | +0.4 |
| De-ionised Water | | +11.5-14.0 |

Example 3

Table 15 details the starting materials according to a further example of the subject invention comprising Ytterbium Oxide ($Yb_2O_3$) as a sintering aid in the manufacture of a SiAlON bonded silicon carbide refractory material.

TABLE 15

Starting materials formulation

| Raw Material | Grade | SC (%) |
| --- | --- | --- |
| Green Silicon Carbide - Coarse | 100/F | 40.0 |
| Green Silicon Carbide - Fine | FCP | 36.0 |
| Silgrain Standard - Silicon Metal Powder | 0-53 μm | 20.0 |
| Reactive Alumina | alpha | 4.0 |
| Iron (III) Oxide - $Fe_2O_3$ | Red Calcined | +0.5 |
| Ytterbium Oxide ($Yb_2O_3$) | Purity >99% | +0.8 |
| Sodium Hydroxide | 1M | +0.4 |
| De-ionised Water | | +11.5-14.0 |

Example 4

Table 16 details the starting materials according to a further example of the subject invention comprising Ytterbium Oxide ($Yb_2O_3$) as a sintering aid in the manufacture of a SiAlON bonded silicon carbide refractory material.

TABLE 16

Starting materials formulation

| Raw Material | Grade | SC (%) |
| --- | --- | --- |
| Green Silicon Carbide - Coarse | 100/F | 40.0 |
| Green Silicon Carbide - Fine | FCP | 36.0 |
| Silgrain Standard - Silicon Metal Powder | 0-53 μm | 20.0 |
| Reactive Alumina | alpha | 4.0 |
| Iron (III) Oxide - $Fe_2O_3$ | Red Calcined | +0.5 |
| Ytterbium Oxide ($Yb_2O_3$) | Purity >99% | +1.7 |
| Sodium Hydroxide | 1M | +0.4 |
| De-ionised Water | | +11.5-14.0 |

Example 5

Table 17 details the starting materials according to a further example of the subject invention comprising Gadolinium Oxide ($Gd_2O_3$) as a sintering aid in the manufacture of a SiAlON bonded silicon carbide refractory material.

TABLE 17

Starting materials formulation

| Raw Material | Grade | SC (%) |
| --- | --- | --- |
| Green Silicon Carbide - Coarse | 100/F | 40.0 |
| Green Silicon Carbide - Fine | FCP | 36.0 |
| Silgrain Standard - Silicon Metal Powder | 0-53 μm | 20.0 |
| Reactive Alumina | alpha | 4.0 |
| Iron (III) Oxide - $Fe_2O_3$ | Red Calcined | +0.5 |
| Gadolinium Oxide ($Gd_2O_3$) | Purity >99% | +1.7 |
| Sodium Hydroxide | 1M | +0.4 |
| De-ionised Water | | +11.5-14.0 |

Example 6

Table 18 details the starting materials according to a further example of the subject invention comprising Lanthanum Oxide ($La_2O_3$) as a sintering aid in the manufacture of a SiAlON bonded silicon carbide refractory material.

TABLE 18

Starting materials formulation

| Raw Material | Grade | SC (%) |
| --- | --- | --- |
| Green Silicon Carbide - Coarse | 100/F | 40.0 |
| Green Silicon Carbide - Fine | FCP | 36.0 |
| Silgrain Standard - Silicon Metal Powder | 0-53 μm | 20.0 |
| Reactive Alumina | alpha | 4.0 |
| Iron (III) Oxide - $Fe_2O_3$ | Red Calcined | +0.5 |
| Lanthanum Oxide ($La_2O_3$) | Purity >99% | +1.7 |
| Sodium Hydroxide | 1M | +0.4 |
| De-ionised Water | | +11.5-14.0 |

Example 7

Table 19 details the starting materials according to a further example of the subject invention comprising Lanthanum Oxide ($La_2O_3$) and Gadolinium Oxide ($Gd_2O_3$) as a sintering aids in the manufacture of a SiAlON bonded silicon carbide refractory material.

TABLE 19

Starting materials formulation

| Raw Material | Grade | SC (%) |
| --- | --- | --- |
| Green Silicon Carbide - Coarse | 100/F | 40.0 |
| Green Silicon Carbide - Fine | FCP | 36.0 |
| Silgrain Standard - Silicon Metal Powder | 0-53 μm | 20.0 |
| Reactive Alumina | alpha | 4.0 |
| Iron (III) Oxide - $Fe_2O_3$ | Red Calcined | +0.8 |
| Gadolinium Oxide ($Gd_2O_3$) | Purity >99% | +0.8 |
| Lanthanum Oxide ($LA_2O_3$) | Purity >99% | +0.8 |
| Sodium Hydroxide | 1M | +0.4 |
| De-ionised Water | | +11.5-14.0 |

Table 20 details the raw La and Gd materials used in the performance testing described here.

TABLE 20

Raw material specification for La and Gd

| Material | TREO | REO | Total other RE oxides | LOI (1000° C.) | $Fe_2O_3$, CaO, $Co_3O_4$, $Cr_2O_3$ |
|---|---|---|---|---|---|
| $La_2O_3$ | Min 99.9% | Min 97% | Min 99.9% $La_2O_3$ | Max 0.1% | <0.1% <1750 ppm total |
| $Gd_2O_3$ | Min 99.99% | Min 99.0% | Min 99.99% $Gd_2O_3$ | Max 100 ppm | Max 1% <40 ppm total |

TREO = total rare earth oxide,
REO = rare earth oxide,
LOI = loss at ignition (at 1000° C.)

Typical particle size, D50=2.5 μm

Further Performance Characteristics

The mechanisms, phase behaviour and findings detailed with respect to example 1 are also applicable to further examples 2 to 7. Additionally, these properties and advantageous effects extend to further specific examples that comprises the stated rare earth oxide either used alone or in combination with each other and additional rare earth oxide such as ytterbium and yttrium.

Bulk Density & Porosity

Density was measured using the Archimedes method and the boiling method for porous samples. Typical standard deviations on density measurements are +/−0.02 g·cm$^{-1}$ Strength Results from three-point bend testing (modulus of rupture, MOR) on test bars with cross-sectional area 12.5 mm×25 mm and test span 125 mm with load rate 3N/s are shown in table 20. The base composition is the SiAlON bonded SiC material with nominally 70 to 75 wt % SiC and 25 to 30 wt % in total of alpha $Si_3N_4$, beta SiAlON and sintering aid. Typical values are from 4 to 6 with standard deviations typically from 5 to 20 MPa. The results are rounded accordingly to the nearest 5 Mpa.

1.7 wt % $Y_2O_3$ as a sintering aid after processing at 1450° C. Quantification shows 76% SiC, 8% alpha $Si_3N_4$, 15% beta SiAlON and 1% ytrria alumina garnet (YAG, $Y_3Al_5O_{12}$). It is noted the unidentified peaks are x-ray tube line artefacts.

Figure 6:
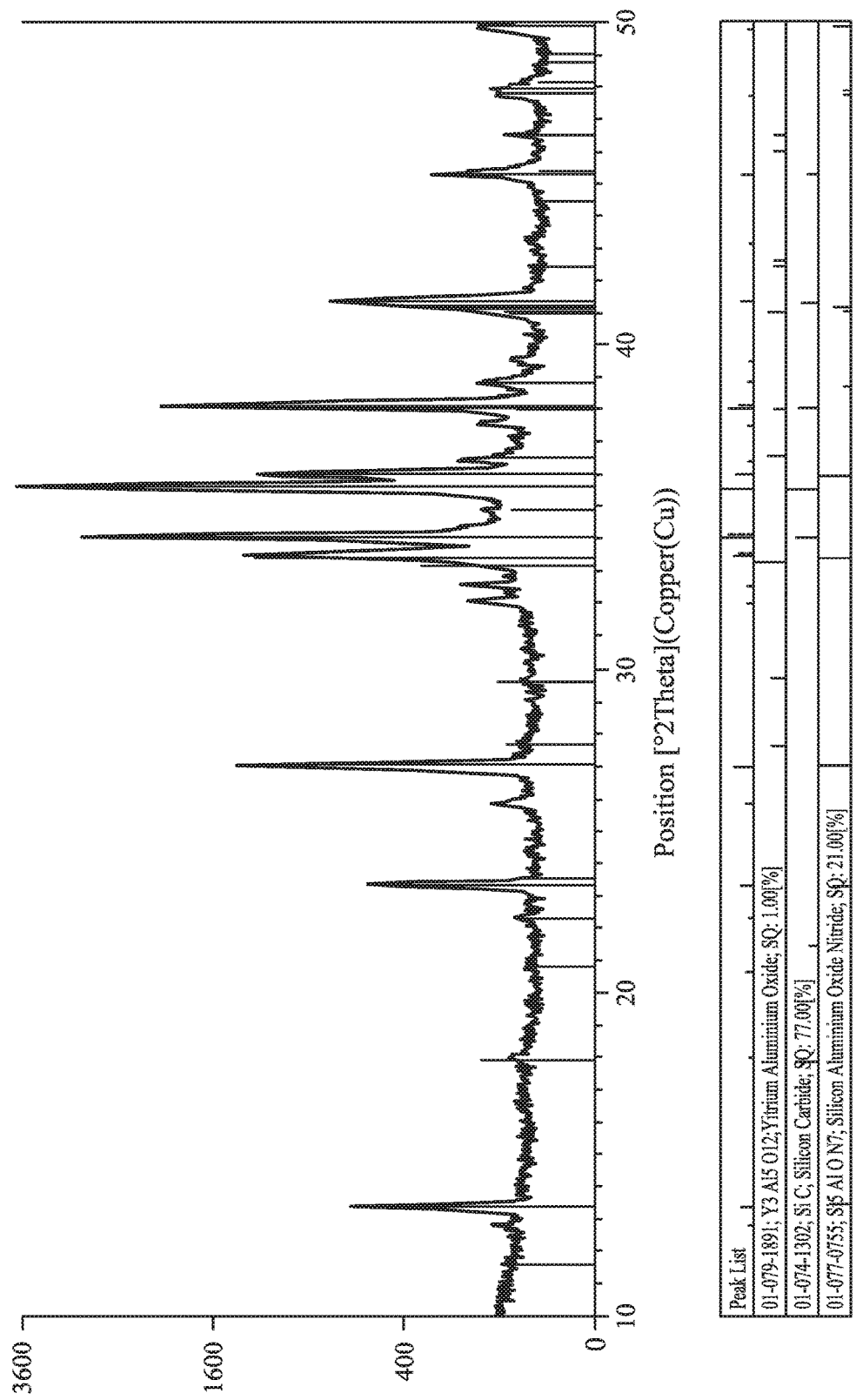
FIG. 6, shows XRD data of a material with a phase composition of a SiAlON bonded SiC material using 1.7 wt % $Y_2O_3$ as a sintering aid after processing at 1450° C. followed by processing at 1650° C.

Referring to FIG. 6, the XRD data confirm the phase composition of a SiAlON bonded SiC material made using 1.7 wt % $Y_2O_3$ as a sintering aid after processing at 1450° C. followed by 1650° C. Quantification shows 77% SiC, 21% beta SiAlON and 1% ytrria alumina garnet (YAG, $Y_3Al_5O_{12}$). It is noted the unidentified peaks are x-ray tube line artefacts.

Figure 7:
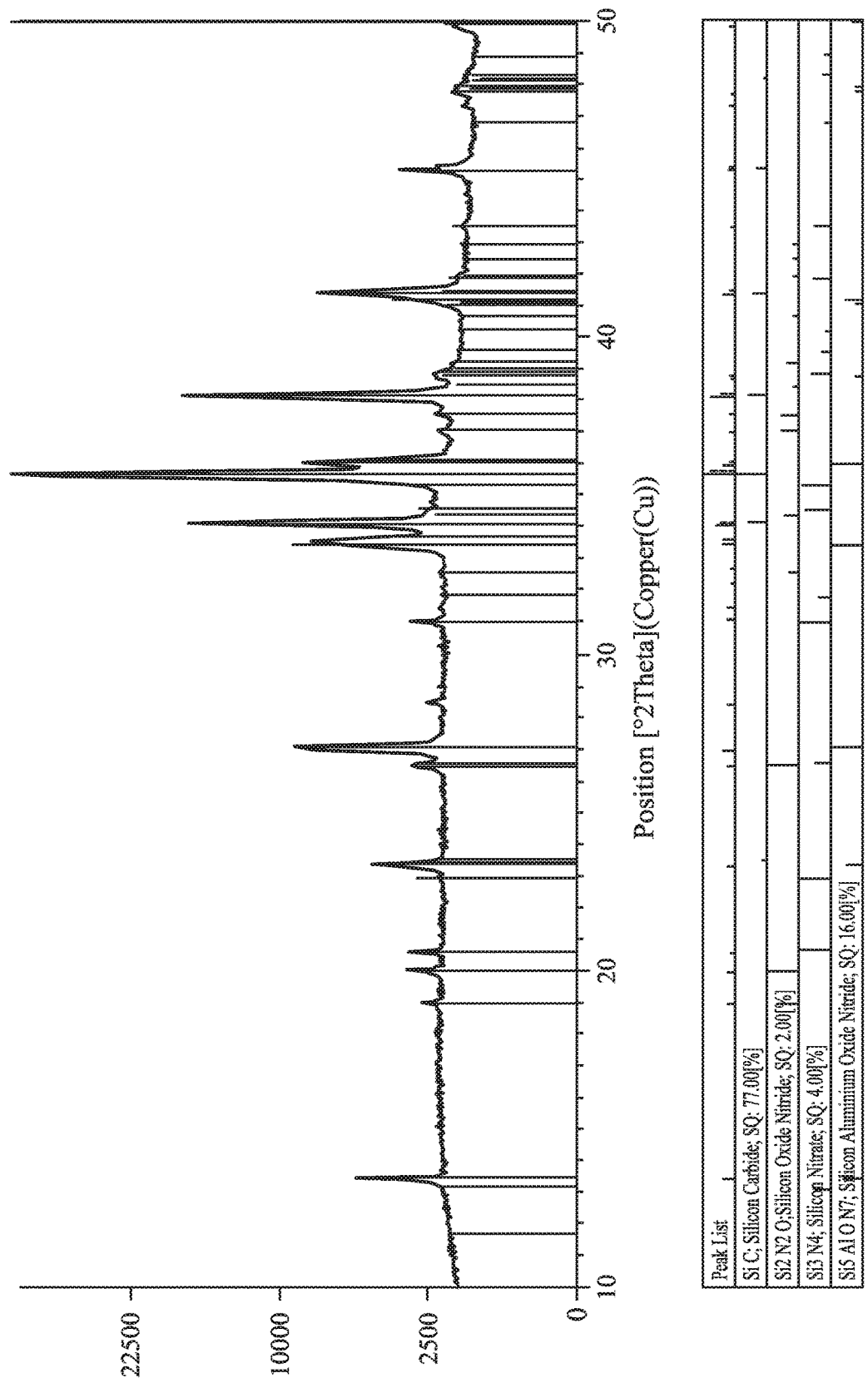
FIG. 7 shows XRD data of a material with a phase composition of a SiAlON bonded SiC material using 1.7 wt % $La_2O_3$ as a sintering aid after processing at 1450° C.

Referring to FIG. 7 the XRD data confirm the phase composition of a SiAlON bonded SiC material made using 1.7 wt % $La_2O_3$ as a sintering aid after processing at 1450° C. Quantification shows 77% SiC, 4% alpha $Si_3N_4$, 16% beta SiAlON and 2% silicon oxynitride ($Si_2N_2O$). $Si_2N_2O$ is formed on the surface under some processing conditions and is not part of the bulk composition but incorporated in to the sample when it is crushed to a powder for XRD.

Figure 8:
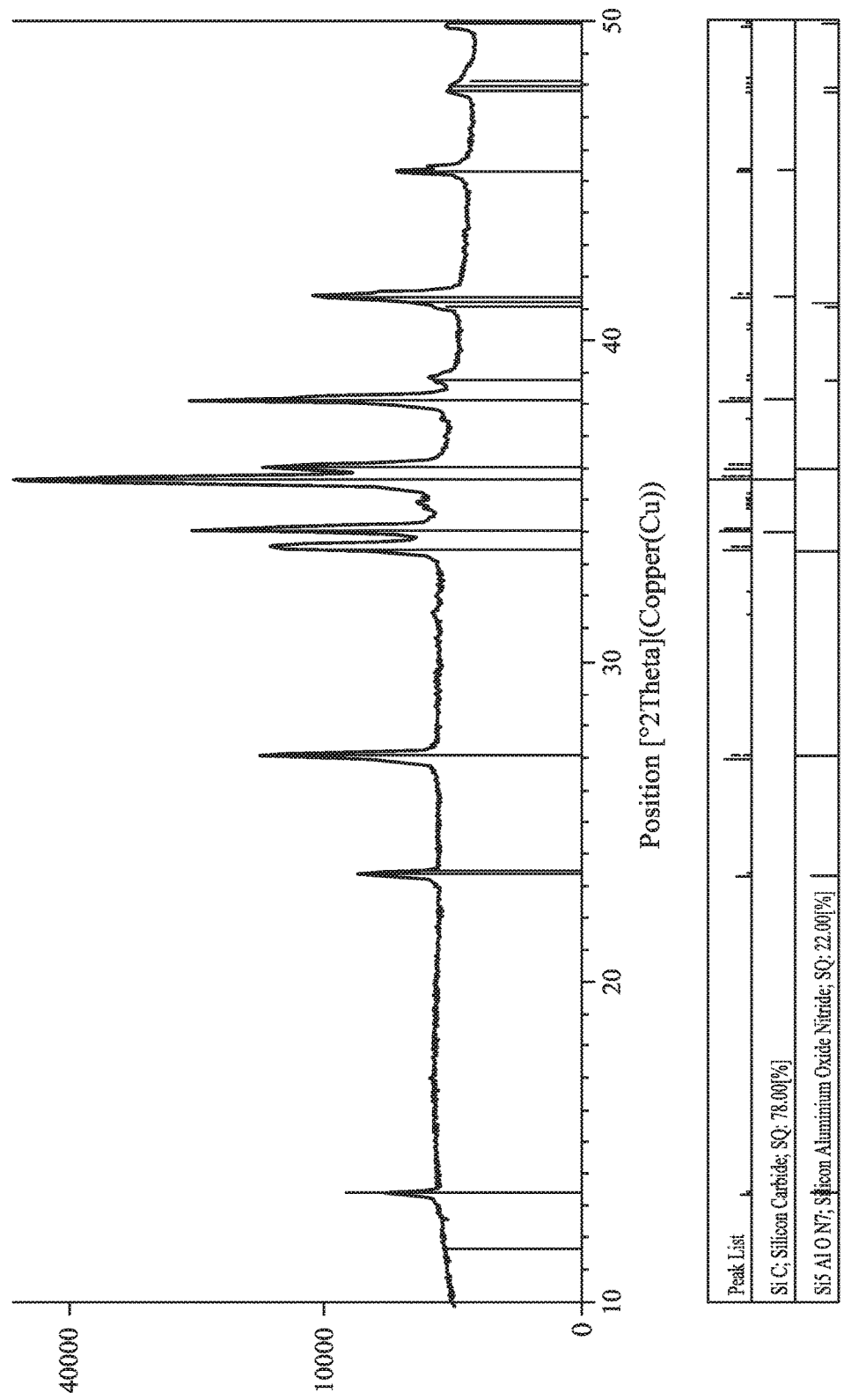
FIG. 8 shows XRD data of a material with a phase composition of a SiAlON bonded SiC material using 1.7 wt % $La_2O_3$ as a sintering aid after processing at 1450° C. followed by processing at 1650° C.

Referring to FIG. 8 the XRD data confirm the phase composition of a SiAlON bonded SiC material made using 1.7 wt % $La_2O_3$ as a sintering aid after processing at 1450° C. and subsequently at 1650° C. Quantification shows 78% SiC and 22% beta SiAlON.

Figure 9:
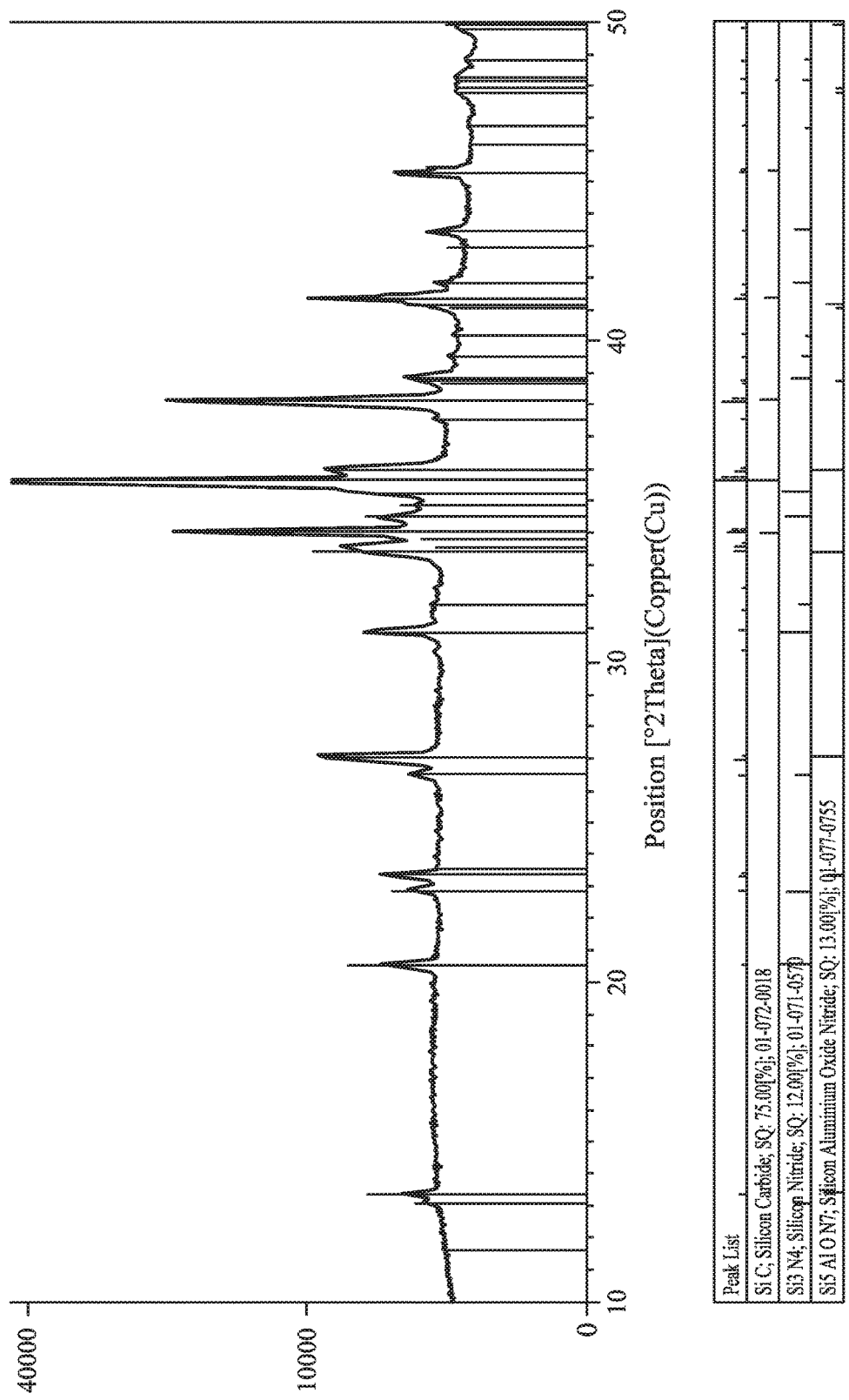
FIG. 9 shows XRD data of a material with a phase composition of a SiAlON bonded SiC material using 1.7 wt % $CeO_2$ (98%) as a sintering aid after processing at 1450° C.

Referring to FIG. 9 the XRD data confirm the phase composition of a SiAlON bonded SiC material made using 1.7 wt % $CeO_2$ (98%) as a sintering aid after processing at 1450° C. Quantification shows 75% SiC, 12% alpha $Si_3N_4$ and 13% beta SiAlON. Despite a phase content similar to other materials this material had a very low strength.

The results as presented in FIGS. 5 to 9 and table 21 confirm that additions of $La_2O_3$ and $Gd_2O_3$ are as least as effective at producing dense and strong materials with the correct phase compositions as the additions of yttria ($Y_2O_3$) or ytterbia ($Yb_2O_3$). This is surprising as yttria is generally regarded by those skilled in the art as the most effective rare earth for sintering due to its propensity to form a liquid phase with $Al_2O_3$ and $SiO_2$ at typical sintering temperatures. The liquid formed with $Y_2O_3$ has a low viscosity and is able

TABLE 21

Three-point bend modulus of rupture and density data for the nominal SiAlON bonded silicon carbide composition with the additives listed.

| Composition | MOR (MPa) after 1450° C. Processing | Density after 1450° C. Processing (g·cm$^{-1}$) | MOR (MPa) after further 1650° C. Processing | Density after further 1650° C. Processing (g·cm$^{-1}$) |
|---|---|---|---|---|
| No Sintering Additive | 140 | 2.75 | 130 | 2.75 |
| +1.7 wt % $Y_2O_3$ | 175 | 2.79 | 185 | 2.84 |
| +1.7 wt % $La_2O_3$ | 185 | 2.80 | 220 | 2.83 |
| +1.7 wt % $Gd_2O_3$ | 200 | 2.76 | 200 | 2.80 |
| +0.8 wt % $Yb_2O_3$ | 150 | 2.78 | 205 | — |
| +1.7 wt % $Yb_2O_3$ | 175 | 2.80 | 185 | — |
| +1.7 wt % $CeO_2$ (98%) | 70 | 2.68 | — | — |
| +1.7 wt % ($CeO_2$ 60% + $La_2O_3$ 40%) | 85 | 2.56 | — | — |

FIGS. 5 to 9 detail XRD data of various rare earth sintering aid materials. The data is evidence for the advantageous affects associated with gadolinium and/or lanthanum based materials. This data is complementary to the strength and density data for such materials as presented in table 21.

Figure 5:
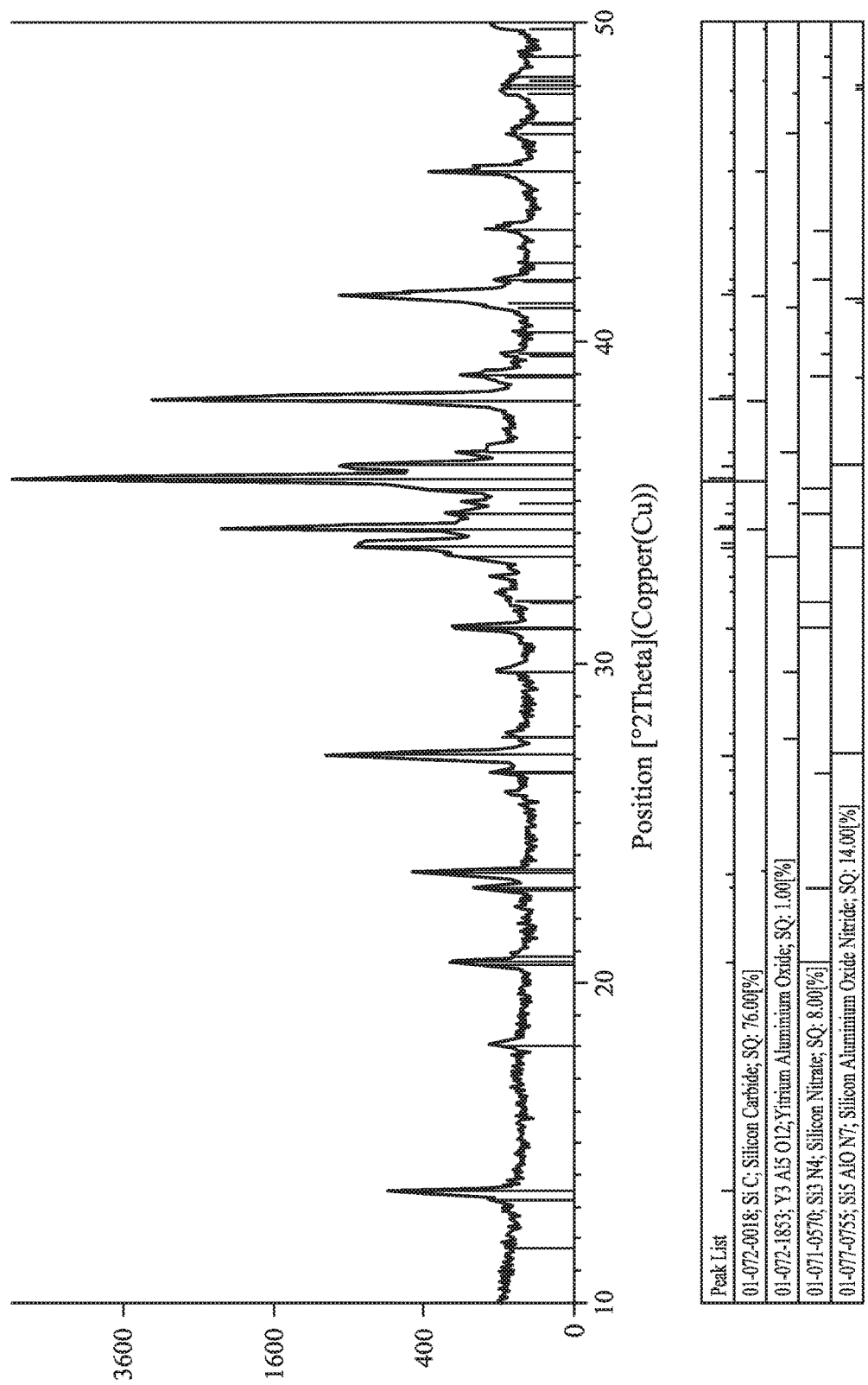
FIG. 5 shows XRD data of a material with a phase composition of a SiAlON bonded SiC material using 1.7 wt % $Y_2O_3$ as a sintering aid after processing at 1450° C.

Referring to FIG. 5, the XRD data confirm the phase composition of a SiAlON bonded SiC material made using to flow between particles allowing an even distribution and rearrangement of particles whilst also having a good solubility of silicon and nitrogen from the alpha silicon nitride phase and thereby promoting the transformation from the alpha to the beta silicon nitride or SiAlON phase.

However, although the above is confirmed for silicon nitride and SiAlON systems, the present results show that the use of gadolinium and lanthanum oxides are equally as effective and in some aspects superior to yttrium oxide or ytterbium oxide, when used in conjunction with silicon carbide as the major phase and combined with the processing conditions described herein. Sintered density, phase composition and three-point bend strength are all comparable if not better than yttria based systems referring to FIGS. 7, 8 and table 21.

The physical and mechanical properties of the present material comprising elemental La and/or Gd in the intergranular phase are unexpected as the results indicate that the use of a more refractory rare earth oxide i.e., $Yb_2O_3$, does not significantly improve performance with regard to density. Other less refractory rare earths such as $CeO_2$ (98%) and mixed rare earths such as 60% $CeO_2$ and 40% $La_2O_3$ produce materials which have approximately half the strength of the material with no additives despite having a phase composition by XRD which would appear to be comparable with good performing sintering aids such as La or Gd. Accordingly, the use of Ga and/or La oxides, or these rare earth oxides in conjunction with other rare earths oxides such as $Y_2O_3$ or $Yb_2O_3$, can produce a material with properties that are surprising.

Furthermore, the subsequent high temperature heat treatment to 1650° C. for 4 hours in a nitrogen atmosphere is shown to promote the formation of 100% beta SiAlON phase in Gd and La containing materials which is further surprising given the accepted view that they are less effective than yttria or ytterbia as sintering aids and less likely to produce enough liquid phase with low enough viscosity and high enough solubility to allow the full conversion of all alpha $Si_3N_4$ to beta SiAlON at the levels at which they are added and the temperature applied.

The invention claimed is:

1. A ceramic material comprising:
   an α-silicon carbide phase of 60 to 80% by weight having at least two mean grain sizes of i) 70 to 250 μm and ii) 0.5 to 50 μm;
   a β-SiAlON phase of 20 to 40% by weight; and
   an intergranular phase at least partially surrounding the α-silicon carbide and β-SiAlON phases of trace to 3% by weight comprising at least one rare earth element.

2. The material as claimed in claim 1 wherein the mean grain sizes comprise i) 110 to 200 μm and ii) 1 to 25 μm.

3. The material as claimed in claim 1 wherein the mean grain sizes comprise i) 115 to 155 μm and ii) 1 to 15 μm.

4. The material as claimed in claim 1 further comprising an α-silicon nitride phase of trace to 40% by weight.

5. The material as claimed in claim 1 wherein the intergranular phase further comprises iron of trace to 10% by weight.

6. The material as claimed in claim 1 further comprising silicon metal.

7. The material as claimed in claim 1 wherein the rare earth element comprises gadolinium and/or lanthanum.

8. The material as claimed in claim 1 wherein the material comprises ytterbium and/or yttrium.

9. The material as claimed in claim 1 wherein the intergranular phase comprises at least one of the following set of:
   Sc; Y; La; Ce; Pr; Nd; Pm; Sm; Eu; Gd; Tb; Dy; Ho; Er; Tm; Yb; Lu.

10. The material as claimed in claim 1 wherein the intergranular phase is formed as a crystalline phase.

11. The material as claimed in claim 10 wherein the crystalline phase is a garnet phase.

12. The material as claimed in claim 1 wherein the intergranular phase is formed as a glass phase.

13. The material as claimed in claim 11 wherein the garnet phase is represented by the formula: $(RE'/RE'')_3Al_5O_{12}$
   where RE' and RE'' each comprise any one of the set of:
   Sc; Y; La; Ce; Pr; Nd; Pm; Sm; Eu; Gd; Tb; Dy; Ho; Er; Tm; Yb; Lu.

14. The material as claimed in claim 1 wherein the β-SiAlON phase is represented by $Si_{6-z}Al_zO_zN_8$-z wherein z is in the range 0.25 to 4.

15. The material as claimed in claim 14 wherein z is in the range 0.6 to 2.0.

16. The material as claimed in claim 1 further comprising a surface oxide layer at a surface of the material containing the intergranular phase and a silicon oxide phase.

17. The material as claimed in claim 16 wherein the surface oxide layer comprises predominantly a rare earth disilicate and the silicon oxide phase comprises silicon oxide cristobalite or the phases silicon oxynitride and/or O-SiAlON.

18. The material as claimed in claim 1 wherein the intergranular phase further comprises at least one or a combination of the elemental constituents: aluminium, oxygen, nitrogen and/or silicon.

19. A process for producing a ceramic material comprising:
   preparing a powdered batch of an admixture comprising:
      α-silicon carbide at 60 to 80% by weight having at least two mean grain sizes of i) 70 to 250 μm and ii) 0.5 to 50 μm;
      powdered silicon metal at 15 to 20% by weight;
      α-alumina at 2 to 6% by weight; and
      at least one rare earth oxide at trace to 3% by weight;
   processing the powdered batch to create a body; and
   heat treating the body under a nitrogenous atmosphere to form: an α-silicon carbide phase; a β-SiAlON phase and an intergranular phase containing at least one rare earth element of the rare earth oxide as part of the ceramic material.

20. The process as claimed in claim 19 wherein the mean grain sizes comprise i) 115 to 200 μm and ii) 1 to 15 μm.

21. The process as claimed in claim 19 wherein the powdered staring materials further comprise:
   iron (III) oxide trace to 10% by weight.

22. The process as claimed in claim 19 wherein the α-silicon carbide is present at:
   70 to 250 μm mean grain sizes at 30 to 40% by weight
   0.5 to 50 μm mean grain sizes at 30 to 40% by weight.

23. The process as claimed in claim 19 wherein the rare earth oxide comprises an oxide of gadolinium and/or lanthanum.

24. The process as claimed in claim 19 wherein the rare earth oxide comprises an oxide of ytterbium and/or yttrium.

25. The process as claimed in claim 19 wherein the intergranular phase comprises at least one of the following set of:
   Sc; Y; La; Ce; Pr; Nd; Pm; Sm; Eu; Gd; Tb; Dy; Ho; Er; Tm; Yb; Lu.

26. The process as claimed in claim 19 wherein the rare earth oxide comprise any one of the set of: $Y_2O_3$ and $Yb_2O_3$; $Y_2O_3$ and $Gd_2O_3$; $Y_2O_3$ and $La_2O_3$; $CeO_2$ and $La_2O_3$; $La_2O_3$ and $Gd_2O_3$.

27. The process as claimed in claim 19 wherein the step of heat treating the body comprises heat treating at a temperature in the range 1300 to 1750° C.

28. The process as claimed in claim 27 comprising heat treating the body at a first processing temperature in the range 1400 to 1500° C.

29. The process as claimed in claim 28 comprising heat treating the body at a second processing temperature in the range 1550 to 1750° C.

30. The process as claimed in claim 29 wherein the step of heat treating the body at the first processing temperature comprises heat treating in a flowing nitrogenous atmosphere; and the step of heat treating the body at the second processing temperature comprises heat treating in a substantially static nitrogenous atmosphere.

31. The process as claimed in claim 30 comprising heat treating the body at the second processing temperature for three to five hours.

32. The process as claimed in claim 31 comprising heat treating the body at a third processing temperature in the range 1100° C. to 1400° C.

33. The process as claimed in claim 32 wherein the step of heat treating the body at the third processing temperature is configured to promote creation of a surface oxide layer comprising a rare earth disilicide, a cristobalite, a silicon oxynitride and/or O-SiAlON.

* * * * *

UNITED STATES PATENT AND TRADEMARK OFFICE
CERTIFICATE OF CORRECTION

PATENT NO. : 9,546,114 B2
APPLICATION NO. : 14/653970
DATED : January 17, 2017
INVENTOR(S) : Anthony Norris Pick et al.

It is certified that error appears in the above-identified patent and that said Letters Patent is hereby corrected as shown below:

On the Title Page

Item (57) In the Abstract, Line 4 reads, "... carbide Ball Hill ceramic comprises ..." which should read, "... carbide ceramic comprises ..."

Item (57) In the Abstract, Line 7 reads, "... within the Vibrating Sieve batch admixture ..." which should read, "... within the batch admixture ..."

In the Specification

Column 1, Line 9 reads, "... titled SALON BONDED SILICON ..." which should read, "... titled SIALON BONDED SILICON ..."

Column 1, Line 10 reads, "... which dams priority ..." which should read, "... which claims priority ..."

Column 16, Line 64 reads, "$(LA_2O_3)$" which should read, "$(La_2O_3)$"

Column 17, Line 24 reads, "... that comprises the stated rare ..." which should read, "... that comprise the stated rare ..."

Column 17, Line 25 reads, "... rare earth oxide such ..." which should read, "... rare earth oxides such ..."

Column 17, Line 30 reads, "... are +/-0.02 $gcm^{-1}$" which should read, "... are +/-0.02 $gcm^{-1}$."

Signed and Sealed this
Fifth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,546,114 B2

In the Claims

Column 20, Line 42 reads, ". . . powdered staring materials further . . ." which should read, ". . . powdered starting materials further . . ."